United States Patent [19] [11] 3,714,221
Yale [45] Jan. 30, 1973

[54] ANTIMICROBIAL ISOCYANIDES
[75] Inventor: Harry L. Yale, New Brunswick, N.J.
[73] Assignee: E. R. Squibb & Sons, Inc., New York, N.Y.
[22] Filed: Dec. 14, 1970
[21] Appl. No.: 98,106

Related U.S. Application Data

[63] Continuation-in-part of Ser. No. 758,115, Sept. 6, 1968, abandoned.

[52] U.S. Cl........260/465 F, 260/465 R, 260/465 G, 260/465 H
[51] Int. Cl...........................C07c 121/52
[58] Field of Search................ 260/465 R, 465 F 260/465 G, 465 H

[56] References Cited

UNITED STATES PATENTS 3,278,371  10/1966  Ugi et al. ............................. 260/465
3,419,596  12/1968  Fetzer et al. .........................260/465
3,422,190  1/1969   Ugi et al. .............................260/465

Primary Examiner—Lewis Gotts
Assistant Examiner—C. F. Warren
Attorney—Lawrence S. Levinson, Merle J. Smith, Donald J. Perrella and Burton Rodney

[57] ABSTRACT

Isocyanides of the formula

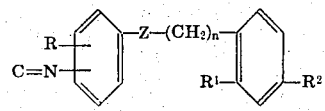

wherein Z represents oxygen or sulfur; R represents hydrogen, halogen, lower alkyl, lower alkoxy, phenyl-lower alkylene, phenyl-lower alkyloxy, trifluoromethyl, cyano, or dimethylaminosulfonyl; $R^1$ and $R^2$ represent hydrogen, halogen, lower alkyl, lower alkoxy, phenyl-lower alkylene, phenyl-lower alkyloxy, trifluoromethyl, cyano, dimethylaminosulfonyl, or isocyanido; and $n$ is 1 or 2, provided that at least one of $R^1$ and $R^2$ is hydrogen, and that when R is other than hydrogen, R and the isocyanido group are positioned, respectively, either ortho and para or para and ortho with respect to Z. These compounds possess utility as antibacterial and parasiticidal agents. They have also demonstrated activity as CNS depressants.

4 Claims, No Drawings

ANTIMICROBIAL ISOCYANIDES

This application is a continuation-in-part of application Ser. No. 758,115 filed Sept. 6, 1968, now abandoned.

This invention relates to novel isocyanides of the formula

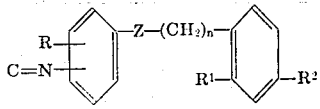

wherein Z represents oxygen or sulfur; R represents hydrogen, halogen, lower alkyl, lower alkoxy, phenyl-lower alkylene, phenyl-lower alkyloxy, trifluoromethyl, cyano, or dimethylaminosulfonyl; $R^1$ and $R^2$ each represents hydrogen, halogen, lower alkyl, lower alkoxy, phenyl-lower alkylene, phenyl-lower alkyloxy, trifluoromethyl, cyano, dimethylaminosulfonyl, or isocyanido; and n is 1 or 2, provided that at least one of $R^1$ and $R^2$ is hydrogen and that when R is other than hydrogen, R and the isocyanido group are positioned, respectively, either ortho and para or para and ortho with respect to Z.

The term "halogen" encompasses chlorine, bromine, fluorine and iodine. Chlorine and bromine are preferred.

The term "lower alkyl" as employed herein includes both straight and branched chain radicals of up to eight carbon atoms, for instance, methyl, ethyl, propyl, isopropyl, butyl, t-butyl, isobutyl, pentyl, hexyl, isohexyl heptyl, 4,4-dimethylpentyl, octyl, 2,2,4-trimethylpentyl and the like.

The term "lower alkoxy" includes straight and branched chain radicals which correspond to the above lower alkyl groups attached to an oxygen atom.

The phenyl-lower alkylene and phenyl-lower alkyloxy groups include phenyl groups including as a substituent a bivalent alkylene or alkyloxy group which corresponds to the lower alkyl or lower alkoxy groups mentioned above.

Particularly preferred are those compounds wherein R represents hydrogen or halogen, $R^1$ is halogen, and n is 1.

Compounds in accordance with Formula I, wherein R, $R^1$, $R^2$, Z and n are as set forth above, may be prepared by one of the reaction sequences A or B shown below, wherein X represents chlorine or bromine.

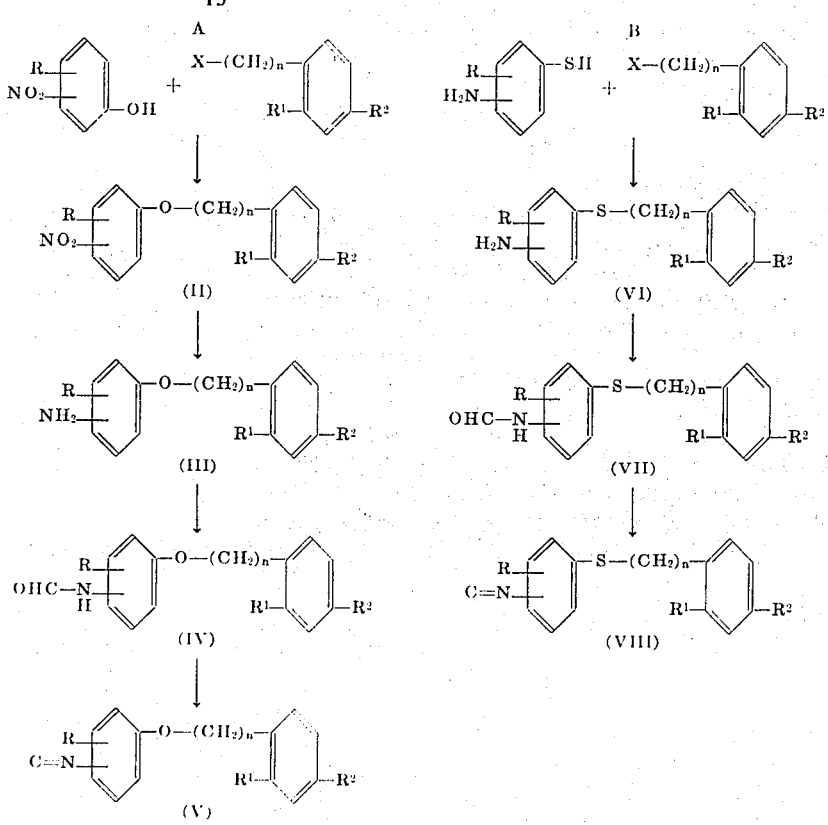

In the initial reaction of the process of this invention, the benzyl or 2-phenethyl halide is reacted with either the nitrophenol or the aminobenzenethiol, the reaction preferably being conducted in the presence of a basic condensation agent, such as sodium hydroxide or sodium methoxide, whereby the corresponding benzyl or 2-phenethylnitrophenyl ether (II) or benzyl or 2-phenethylthioaniline derivative (VI) is formed.

In the case of the nitrophenyl ether (II), the nitro group is then reduced to an amine as by treatment with a reducing agent such as nascent hydrogen, which may be formed in situ by the action of an electropositive metal, such as iron, on an acid, such as hydrochloric acid, thereby forming the corresponding 2-(benzyloxy)aniline derivative. Alternatively, the nitro group may be reduced by catalytic hydrogenation, as for instance with a palladium catalyst in the presence of an alcohol, such as ethanol or isopropanol.

The aniline derivative is then treated with formic acid, whereby the corresponding formanilide derivative (IV or VII) is produced.

The formanilide derivative may then be reacted with a mixture of 1 equivalent each of phosgene and triethylamine in a solvent such as methylene chloride to produce the desired isocyanides (V and VIII) which are the final products of this invention.

Alternatively, the formanilide derivative may be reacted with a mixture of one equivalent each of pyridine and either benzenesulfonyl chloride or p-toluenesulfonyl chloride, again in a solvent such as methylene chloride.

It will be understood, of course, that in those cases wherein it is desired to produce a product wherein $R^1$ or $R^2$ represent isocyanido, the corresponding nitro or amino benzyl or phenethyl halide will be employed as a starting material.

The final products of this invention (compounds in accordance with Formula I) possess antimicrobial properties, inhibiting organisms such as S. aureus, T. mentagrophytes, T. vaginalis, Mycobacterium tuberculosis (BCG), and F. bulbiginum. They are useful as disinfectants in aqueous solutions or suspensions, preferably also containing a detergent, in concentrations of about 0.5 to 10 percent and may be used as washes to disinfect floors, walks, tables and the like. They are also useful as laboratory reagents to prevent overgrowth of the above when attempting to demonstrate the presence of other organisms, such as Klebsiella species in cultures. These compounds are also useful as central nervous system depressants when employed in animal species. As such they may be administered to animals, such as cats, dogs, mice, horses, cattle, and the like, in the treatment of hyperirritability in oral dosage forms, such as tablets or capsules, in a dosage range of about 10 to 500 mg. per day. They may, addition, be administered in a suitable parenteral formulation, such as an oil suspension if so desired.

The following examples illustrate the invention. All temperatures are in degrees Centigrade.

EXAMPLE 1 o-[(o-Bromobenzyl)thio]phenyl isocyanide

A. Preparation of o-[(o-bromobenzyl)thio]aniline hydrochloride

To a stirred solution of 119.5 g. of o-bromobenzyl bromide and 62.5 g. of o-aminobenzenethiol in 400 ml. of 95 percent ethanol, thoroughly purged with nitrogen, is added dropwise a solution of 39.6 g. of 85 percent potassium hydroxide in 200 ml. of water and the reaction mixture subsequently refluxed for two hours. The mixture s then concentrated to dryness. The residue is dissolved in one liter of ether. This ether solution is dried and treated with 2.5 N ethereal hydrogen chloride to give o-[(o-bromobenzyl)thio]aniline hydrochloride.

B. Preparation of o-[(o-bromobenzyl)thio]formanilide

To 11.47 g. of o-[(o-bromobenzyl)thio]aniline hydrochloride is added 5.0 g. of dry sodium formate and 67 ml. of 98-100 percent formic acid, and the mixture refluxed for three hours and then concentrated to dryness on the rotary evaporator. The residue is triturated with a mixture of 25 ml. of water and 50 ml. of ether until granulation occurs. The solid is filtered to give 9.6 g. of material, m.p. 110°–112°. Recrystallization from heptane gives o-[(o-bromobenzyl)thio]formanilide, m.p. 112°–114°.

C. Preparation of o-[(o-bromobenzyl)thio]phenyl isocyanide

To 23.0 g. of crude formamido derivative, 18.3 g. of triethylamine, and 185 ml. of reagent grade methylene chloride is added dropwise in 1.5 hours 57 ml. of a 13.9 percent solution of phosgene in toluene, maintaining the reaction temperature at 2° to 4°. Subsequently, the temperature is allowed to rise to 10° during 2 hours, then allowed to rise to 20° and 185 ml. of an ice-water mixture is added. The organic layer is separated, dried, and concentrated on the rotary evaporator. The semisolid residue is dissolved in 250 ml. of benzene and poured on a column of 190 g. of Harshaw activated alumina, chromatographic grade, prepared in benzene. The elution is effected with 20 percent chloroform-80 percent hexane. The following summarizes the chromatographic results:

Cut I, 250 ml. — benzene solvent — 0.06 g. solid residue

Cut II, 250 ml. — mostly benzene — 11.0 g. solid residue

Cut III, 250 ml. — $CHCl_3$—hexane — 2.30 g. solid residue

Cut IV, 250 ml. — $CHCl_3$—hexane — 1.70 g. solid residue

Cut V, 250 ml. — $CHCl_3$—hexane — 0.90 g. semisolid residue

Cut VI, 250 ml. — $CHCl_3$—hexane — trace semisolid residue

Cut VII, 500 ml. — $CHCl_3$—hexane — trace oil. Cuts II, III, IV, and V are triturated with 140 ml. of boiling pentane, and the hot pentane solution decanted. The pentane insoluble material is recrystallized from 340 ml. of hexane and dried at 56° to give 7.45 g. of large pale yellow prisms, m.p. 88°–90°.

EXAMPLE 2 o-[(o-Bromobenzyl)oxy]phenyl isocyanide

A. Preparation of o-[(o-bromobenzyl)oxy]nitrobenzene

To a stirred solution of 119.5 g. of o-bromobenzyl bromide and 83.6 g. of o-nitrophenol in 400 ml. of 95 percent ethyl alcohol is added dropwise a solution of 39.6 g. of 85 percent potassium hydroxide in 200 ml. of water and the reaction mixture subsequently refluxed for two hours. After cooling, the product separates and is filtered, washed well with water, and air dried to give about 149.6 g. of o-[(o-bromobenzyl)oxy]nitrobenzene, m.p. about 82°–83°. Upon recrystallization from 95 percent ethyl alcohol, the product melts at 82.5°–83°.

B. Preparation of o-[(o-bromobenzyl)oxy]aniline hydrochloride

To a stirred mixture of 149.0 g of o-[(o-bromobenzyl)-oxy] nitrobenzene, 270 g. of iron powder and 3.5 l. of 95 percent ethyl alcohol is added 25 ml. of concentrated hydrochloric acid. There is a mild exothermic reaction which is allowed to subside and heating is continued cautiously to reflux. After heating for one hour, the reaction mixture is filtered hot, and to the filtrate is added 300 ml. of concentrated hydrochloric acid and the whole cooled to give o-[(o-bromobenzyl)oxy]aniline hydrochloride.

C. Preparation of o-[(o-bromobenzyl)oxy]formanilide

A mixture of 78.8 g. of o-[(o-bromobenzyl)oxy]-aniline hydrochloride, 34.0 g. of dry sodium formate, and 460 ml. of 98–100 percent formic acid is stirred and heated under reflux for 3 hours, cooled somewhat, and poured into 1 l. of ice-water. The solid which separates is filtered and washed with water to give 61.4 g. of o-[(o-bromobenzyl)oxy]formanilide, m.p. 113°–114°.

D. Preparation of o-[(o-bromobenzyl)oxy]phenyl isocyanide

To 27.2 g. of the formamide derivative, at 0° to 5° is added dropwise 64 ml. of a 13.9 percent solution of phosgene in toluene (equivalent to 8.8 g.). The reaction is exothermic and 1.5 hours are required for the addition. The mixture is allowed to warm to 10° in three hours and to 20° in 0.25 hours, at which time 222 ml. of ice-water is added. To organic layer is separated, dried, and concentrated to dryness on the Rinco. The residual brown oil crystallizes spontaneously; it weighes 26.4 g., m. 58°–73°. Thin layer chromatography on silica gel gives a blue fluorescing spot, $R_f$ 0.5 (5 percent $CHCl_3$—95 percent petroleum), $R_f$ 0.69 (10 percent $CHCl_3$—90 percent petroleum ether). The formamido compound does not move in these systems ($R_f$=0.0). The entire crude product is extracted with 1350 ml. of boiling hexane, the hexane filtrate is refluxed 0.25 hour with 1 g. of Darco and 0.5 g. Hyflo and filtered. The filtrate deposites a crystalline product (Solid A) which is filtered and dried to give 10.8 g. of yellow solid, m.p. 73°–83.

In the infrared this material shows strong absorption at 2125 $cm^{-1}$ (—N≡C) and 1708 $cm^{-1}$ (>C=O). That the latter absorption is due to an impurity is demonstrated by micro sublimation: 0.2 g. is heated at 170°/0.05 mm. to give 0.13 g. of a colorless solid, m.p. 78°–80° which shows strong absorption at 2125 $cm^{-1}$ but no absorption at 1708 $cm^{-1}$. In the process, however, the residue from the sublimation is converted to a black tar. Since it is desirable to identify the impurity in the isonitrile, column chromatography is employed.

The hexane filtrate from Solid A is concentrated to 300 ml. and poured on a column of Harshaw activated alumina prepared in hexane. Elution with 80 percent hexane-20 percent chloroform (240 ml. for each elution) yields the following:

1. 4.09 g., m.p. 80°–82°
2. 1.78 g., m.p. 79°–81°
3. 0.75 g., m.p. 80°–84°.

At this point there remains a yellow band on the column, and this is eluted with 240 ml. of chloroform. The chloroform eluate yields 1.35 g. of residue (4), m. 71°–87.

(1), (2), and (3) are recrystallized from 75 ml. of hexane to give 6.53 g. of colorless crystals, m. 84.0-85.5, showing only strong absorption at 2125 $cm^{-1}$ and no absorption at 1708 $cm^{-1}$.

Solid A (10.8 g.) is dissolved in 600 ml. of hexane, chromatographed on 150 g. of Harshaw activated alumina, and eluted as above, except that each elution is 480 ml. of 80 percent hexane-20 percent chloroform. The following are obtained:

1) 0.32 g., no m.p. taken
2) 4.23 g., m.p. 79°–81°
3) 0.86 g., m.p. 79–81°
4) 0.55 g., no m.p. taken.

480 ml. chloroform eluate yielded 3.6 g. of material (5).

From the hexane recrystallization of (1), (2), (3), and (4) there is obtained 5.67 g. of material, m.p. and mixture m.p. with the product above, 84.0°–85.5°.

The 1.35 g. of residue from the chloroform elution of the first chromatogram was recrystallized from 30 ml. of hexane to give 0.97 g. of additional isocyanide, m.p. and mixture m.p., 84.0°–85.5°. The total yield of product, 2-[(o-bromobenzyl)oxy]phenyl iso-cyanide, is 13.13 g.

The 3.6 g. of residue from the chloroform elution of the second chromatogram is recrystallized from 65 ml. of Skellysolve E to give 1.0 g of the starting formamido compound, identified by m.p., mixture m.p., and infrared spectrum. The presence of this material accounts for the absorption at 1708 $cm^{-1}$.

EXAMPLE 3

2-o-Methylphenethyl Bromide

A. To 24.3 g. of magnesium turning in 1 l. of anhydrous ether is added a crystal of iodine and 25 ml. of a solution of 171 g. of o-bromotoluene. The reaction is initiated by slight heating, and the remainder of the o-bromotoluene solution is added with stirring at a rate to maintain a moderate reflux. Subsequently, the mixture is stirred and refluxed for 1 hour, cooled with wet ice, and a stream of ethylene oxide gas introduced into the rapidly agitated o-tolylmagnesium bromide. The mixture is tested periodically and when it gives a negative color test with Michler's ketone-iodine, the introduction of ethylene oxide is terminated. The mixture is made slightly acid with 10 percent aqueous hydrochloric acid and the ether layer is separated, washed with saturated aqueous sodium chloride solution, dried, concentrated, and the residue distilled to give 2-o-methylphenethyl alcohol. B) To the product from A), 68 g., in 250 ml. of alcohol free chloroform is added dropwise 104 g. of thionyl bromide. Subsequently, the mixture is stirred and refluxed for 1 hour, concentrated, and the residue distilled to give 2-o-methylphenethyl bromide.

EXAMPLE 4 p-Bromomethylbenzonitrile

A. A mixture of 135 g. of p-toluamide, 142 g. of phosphorous pentoxide and 1 l. of dry toluene is stirred and refluxed for 3 hours, cooled, the toluene solution is decanted from the gummy residue, washed with saturated aqueous sodium chloride, dried, concentrated, and the residue distilled to give p-tolunitrile.

B. To 58.5 g. of the product from A) and 1.0 g. of benzoyl peroxide at 100°, while irradiating with an ultra-violet lamp, is added dropwise 160 g. of bromine during one hour. The mixture is blown free of hydrogen bromide and distilled to give p-bromomethylbenzonitrile.

EXAMPLE 5 p-Bromomethyl-$\alpha,\alpha,\alpha$-trifluorotoluene

To 80 g. of $\alpha,\alpha,\alpha$-trifluoro-p-xylene and 1.0 g. of benzoyl peroxide at 100° is added dropwise 160 g. of bromine while the mixture is irradiated by means of an ultraviolet lamp. The addition requires 1 hour. Subsequently, the mixture is blown free of hydrogen bromide and distilled to give p-bromomethyl-α,α,α-trifluorotoluene.

EXAMPLE 6 o-(Benzyloxy)benzyl Bromide

A. To 152 g. of methyl salicylate in 500 ml. of absolute methanol is added in portions a total of 54 g. of dry sodium methoxide and the mixture stirred for 1 hour. To the mixture is then added dropwise 171 g. of benzyl bromide and the whole, subsequently, refluxed for 1 hour. The methanol is removed on the rotary evaporator, and the residue distributed between 1 l. of ether and 500 ml. of water. The ether layer is separated, washed, dried and concentrated to give methyl o-benzyloxybenzoate.

B. To 121 g. of the product from A) in 500 ml. of anhydrous ether is added dropwise a solution of 19 g. of lithium aluminum hydride in 250 ml. of anhydrous ether. Subsequently, the mixture is stirred and refluxed for 1 hour and worked up to give o-benzyloxybenzyl alcohol.

C. Employing the procedure of Example 3 B) but, substituting 107 g. of the product from B) for the product in that example, there is obtained o-benzyloxybenzyl bromide.

EXAMPLE 7

2-p-Methoxyphenethyl Bromide

A. Following the procedure of Example 3 A) but substituting 187 g. of p-bromoanisole for the o-bromotoluene, there is obtained p-methoxyphenethyl alcohol.

B. By substituting 76 g. of the product from A) for the 2-o-methylphenethyl alcohol in Example 3 B), there is obtained 2-p-methoxyphenethyl bromide.

EXAMPLE 8

N,N-Dimethyl-p-bromomethylbenzenesulfonamide

By substituting 100 g. of N,N-dimethyl-p-toluenesulfonamide for the p-toluenitrile in Example 4 B), there is obtained N,N-dimethyl-p-bromomethylbenzene-sulfonamide.

Example 9 o-(Benzyl)benzyl Bromide

A. A solution of 42.4 g. of diphenylmethane-2-carboxylic acid, 400 ml. of methanol, and 20 ml. of concentrated sulfuric acid is refluxed for 4 hours and concentrated on the rotary evaporator. The residue is cooled, and treated with 500 ml. of ether and 300 g. of ice. The mixture is shaken thoroughly and the ether ayer is separated, washed with water, 2 percent aqueous sodium hydroxide, saturated sodium chloride, dried, concentrated and the residue distilled to give methyldiphenylmethane-2-carboxylate.

B. The product from A), 45.2 g., in 200 ml. of dry ether is reduced with 7.6 g. of lithium aluminum hydride as in Example 6 B) to give o-(benzyl)benzyl alcohol.

C. The product from B), 19.8 g., in 200 ml. of alcohol free chloroform is reacted with 20.4 g. of thionyl bromide as in Example 3 B) to give o-(benzyl)benzyl bromide.

Following the procedure of Example 1 or 2, whichever is pertinent, but employing as starting materials the aminothiophenol or nitrophenol shown in Column A and the benzyl or phenethyl halide shown in Column B, the product shown in Column C is obtained.

| Example | A | B | C |
|---------|---|---|---|
| 10 | O₂N-C₆H₃-OH | Br-(CH₂)₂-C₆H₄-Br | (structure with O-(CH₂)₂, C=N, Br) |
| 11 | C₆H₄(SH)(NH₂) | Cl-CH₂-C₆H₄-Cl | (structure with S-CH₂, N=C, Cl) |
| 12 | O₂N-C₆H₃-OH (NO₂) | Br-CH₂-C₆H₄-NO₂ | (structure with O-CH₂, N=C, C=N) |
| 13 | Cl-C₆H₃(OH)(NO₂) | Br-(CH₂)₂-C₆H₄-O₂N | (structure with O-(CH₂)₂, Cl, N=C, C=N) |
| 14 | C₆H₄(OH)(NO₂) | Br(CH₂)₂-C₆H₄-CH₃ | (structure with O-(CH₂)₂, N=C, CH₃) |

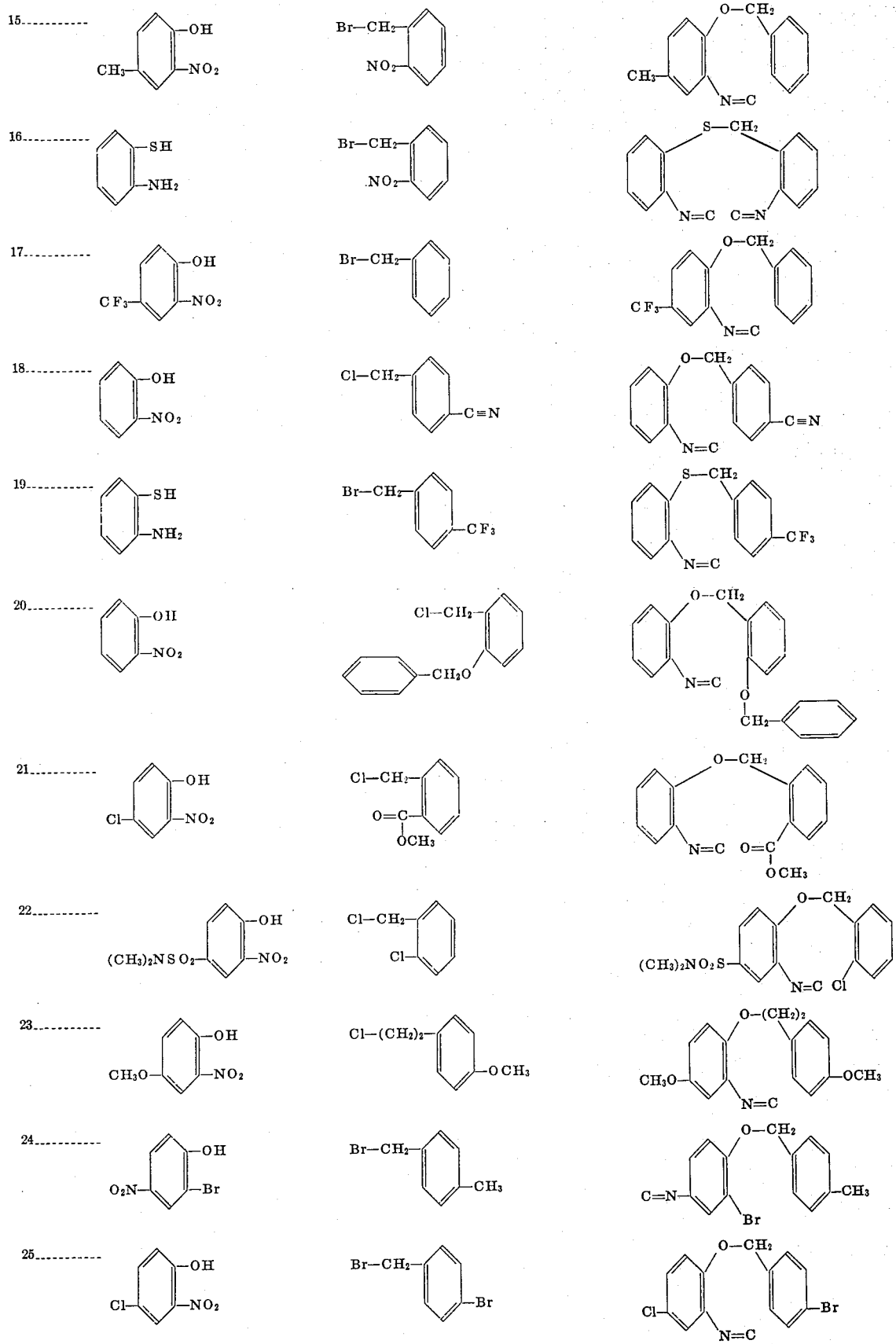

| Example | A | B | C |
|---|---|---|---|
| 26 | 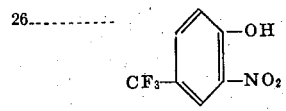 | 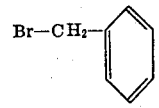 | 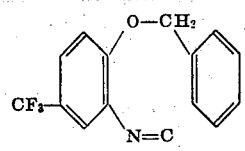 |
| 27 | 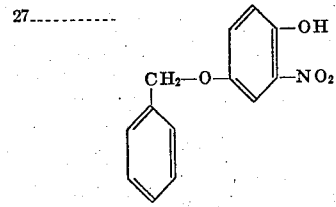 | 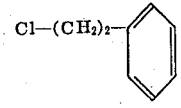 | 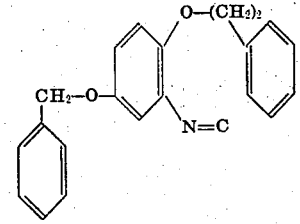 |
| 28 | 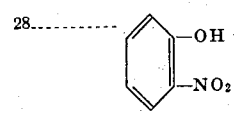 | 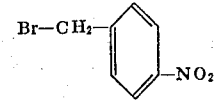 | 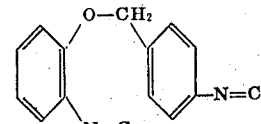 |
| 29 | 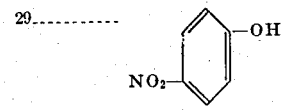 | 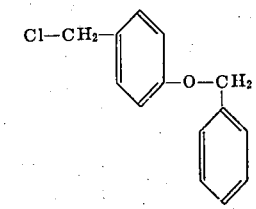 | 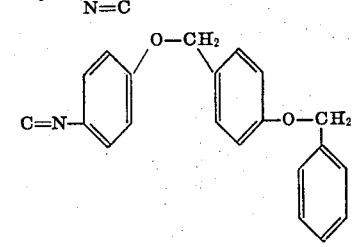 |
| 30 | 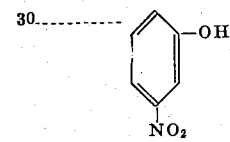 | 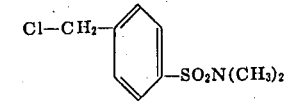 | 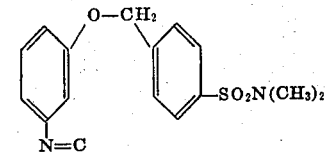 |
| 31 | 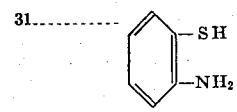 | 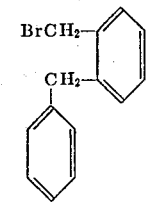 | 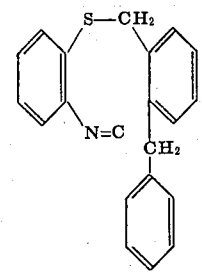 |
| 32 | 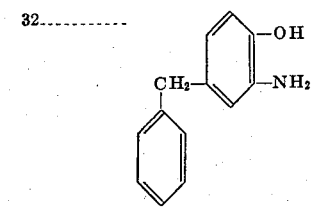 | 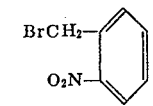 | 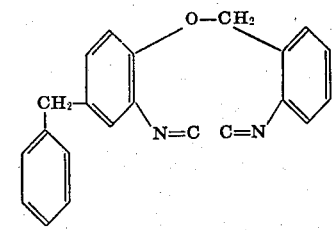 |
| 33 | 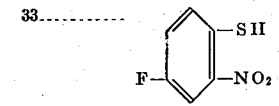 | 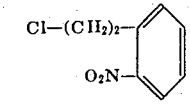 | 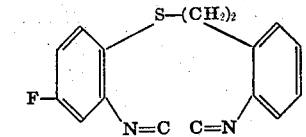 |
| 34 | 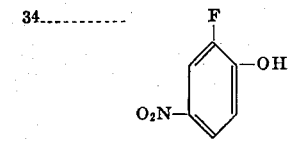 | 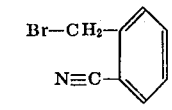 | 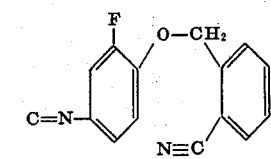 |

| Example | A | B | C |
|---|---|---|---|

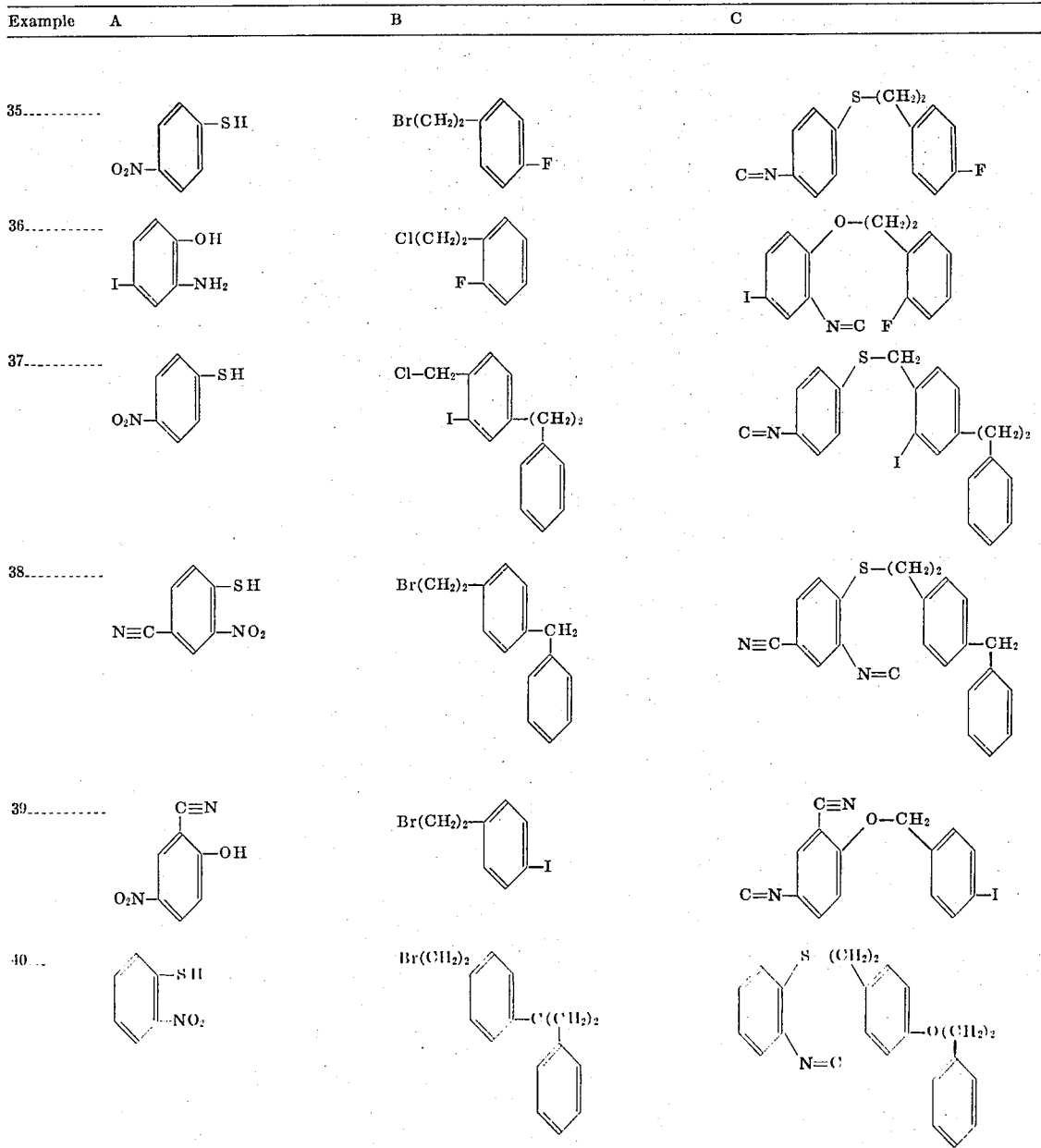

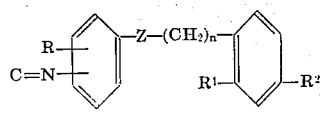

What is claimed is:
1. An isocyanide of the formula wherein Z is selected from the group consisting of oxygen and sulfur; R is selected from the group consisting of hydrogen, halogen, alkyl containing one to eight carbons, alkoxy containing one to eight carbons, phenyl-lower alkylene containing one to four carbons in the alkylene group, phenyl- lower alkyleneoxy 1 to 4 carbons in the alkyleneoxy group, trifluoromethyl, cyano, and dimethylaminosulfonyl; $R^1$ and $R^2$ are each selected from the group consisting of hydrogen, halogen, alkyl containing one to eight carbons, alkoxy containing one to eight carbons, phenyl-lower alkylene containing one to four carbons in the alkylene group, phenyl-lower alkyleneoxy containing one to four carbons in the alkyleneoxy group, trifluoromethyl, cyano, dimethylaminosulfonyl, and isocyanido; and n is 1 or 2, provided that at least one of $R^1$ and $R^2$ is hydrogen, and that when R is other than hydrogen, R and the isocyanido group and positioned, respectively, either ortho and para or para and ortho with respect to Z, and where R is halogen, $R^1$ and $R^2$ can be a halogen selected from the group consisting of chlorine and bromine.

2. A compound according to claim 1 wherein R is selected from the group consisting of hydrogen and halogen, $R^1$ is halogen, and n is 1.

3. A compound in accordance with claim 2 wherein R is hydrogen, $R^1$ is bromine, n is 1, Z is sulfur, and the isocyanido group is positioned ortho to the sulfur.

4. A compound in accordance with claim 2 wherein R is hydrogen, $R^1$ is bromine, n is 1, Z is oxygen, and the isocyanido group is positioned ortho to the oxygen.

* * * * *

UNITED STATES PATENT OFFICE
CERTIFICATE OF CORRECTION

Patent No. 3,714,221  Dated January 30, 1973

Inventor(s) Harry Louis Yale

It is certified that error appears in the above-identified patent and that said Letters Patent are hereby corrected as shown below:

Column 1, formula I under column A, that portion of the formula which reads:

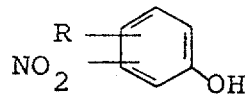

Column 13, line 60, Claim 1., after "alkyleneoxy" insert -- containing --.

Signed and sealed this 10th day of July 1973.

(SEAL)
Attest:

EDWARD M. FLETCHER, JR.
Attesting Officer

Rene Tegtmeyer
Acting Commissioner of Patents